(12) United States Patent
Popescu et al.

(10) Patent No.: US 12,393,584 B2
(45) Date of Patent: Aug. 19, 2025

(54) GENERATING TRAINING DATA FOR A MACHINE LEARNING MODEL THAT PERFORMS TEXT-TO-SQL

(71) Applicant: INTERNATIONAL BUSINESS MACHINES CORPORATION, Armonk, NY (US)

(72) Inventors: Octavian Popescu, Westchester, NY (US); Hangu Yeo, Westchester, NY (US); Vadim Sheinin, Yorktown Heights, NY (US); Irene Lizeth Manotas Gutiérrez, White Plains, NY (US); Ngoc Phuoc An Vo, Bronx, NY (US); Elahe Khorasani, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/240,835

(22) Filed: Aug. 31, 2023

(65) Prior Publication Data
US 2025/0077517 A1     Mar. 6, 2025

(51) Int. Cl.
*G06F 16/24* (2019.01)
*G06F 16/2453* (2019.01)
*G06N 20/00* (2019.01)

(52) U.S. Cl.
CPC ....... *G06F 16/24544* (2019.01); *G06N 20/00* (2019.01)

(58) Field of Classification Search
CPC .......................... G06F 16/24544; G06N 20/00
See application file for complete search history.

(56) References Cited

U.S. PATENT DOCUMENTS

| 9,613,025 B2 | 4/2017 | Heo et al. |
| 9,959,311 B2 | 5/2018 | Boguraev et al. |
| 2017/0109434 A1 | 4/2017 | Boxwell et al. |

(Continued)

FOREIGN PATENT DOCUMENTS

| CN | 110019555 A | 7/2019 |
| CN | 113177123 A | 7/2021 |

(Continued)

OTHER PUBLICATIONS

Xu et al, "SQL-to-Text Generation with Graph-to-Sequence Model", Peking University, 2019, Feb. 2019, 6 pages.*
Feng, S.Y. et al., "A survey of data augmentation approaches for NLP," arXiv preprint, arXiv:2105.03075, May 7, 2021, 21 pg.

(Continued)

*Primary Examiner* — Loc Tran
(74) *Attorney, Agent, or Firm* — Harrity & Harrity, LLP

(57) ABSTRACT

A set of values can be selected from a plurality of fields of a table in a database. At least one adverb or adjective can be selected for the set of values. Join paths for values in the set of values can be determined. A structured query language pattern can be determined based, at least in part, on at least one value in the set of values, the at least one adverb or adjective for the set of values, and the join paths for the set of values. The structured query language pattern can be stored to first training data configured, at least in part, for use in machine learning to train a text-to-SQL model, the text-to-SQL model comprising a first artificial neural network and configured to convert first natural language text to a first structured query language query.

20 Claims, 8 Drawing Sheets

(56) References Cited

U.S. PATENT DOCUMENTS

| | | | |
|---|---|---|---|
| 2017/0270191 A1 | 9/2017 | Levas et al. | |
| 2020/0133952 A1* | 4/2020 | Sheinin | G06N 3/045 |
| 2021/0191936 A1 | 6/2021 | Khorasani et al. | |
| 2021/0390096 A1* | 12/2021 | Rahmfeld | G10L 15/08 |
| 2023/0169075 A1* | 6/2023 | Han | G06F 16/243 |
| | | | 707/769 |
| 2024/0104092 A1* | 3/2024 | Saha | G06F 16/24528 |

FOREIGN PATENT DOCUMENTS

| | | |
|---|---|---|
| CN | 114817295 A | 7/2022 |
| CN | 112069199 B | 8/2022 |
| CN | 112287093 B | 8/2022 |
| KR | 20220109978 A | 8/2022 |

OTHER PUBLICATIONS

Wu, K. et al., "Data augmentation with hierarchical SQL-to-question generation for cross-domain text-to-SQL parsing," arXiv preprint, arXiv:2103.02227, Mar. 3, 2021, 10 pg.

"Spider 1.0, Yale Semantic Parsing and Text-to-SQL Challenge," [online] Website for the Lily Group at Yale University [retrieved May 5, 2023], retrieved from the Internet: <https://yale-lily.github.io/spider>, 13 pg.

Shi, P. et al., "Learning contextual representations for semantic parsing with generation-augmented pre-training" In Proceedings of the AAAI Conference on Artificial Intelligence, May 18, 2021, vol. 35, No. 15, pp. 13806-13814.

Mell, P. et al., The NIST Definition of Cloud Computing, National Institute of Standards and Technology, U.S. Dept. of Commerce, Special Publication 800-145, Sep. 2011, 7 pg.

* cited by examiner

400

```
┌─────────────────────────────────────────────────────────────┐
│ SELECT, FROM A TRAINING CORPUS, A DATABASE SCHEMA THAT      │
│ INCLUDES A SAME TYPE OF DATA AS A NEW DATABASE SCHEMA       │
│                            402                              │
└─────────────────────────────────────────────────────────────┘
                              ↓
┌─────────────────────────────────────────────────────────────┐
│   SELECT A SQL QUERY FROM TRAINING DATA FOR THE SELECTED    │
│                    DATABASE SCHEMA                          │
│                          404                                │
└─────────────────────────────────────────────────────────────┘
                              ↓
┌─────────────────────────────────────────────────────────────┐
│  REPLACE, IN SELECTED SQL QUERY, TABLE AND FIELD NAMES      │
│   WITH CORRESPONDING TABLE AND FIELD NAMES FOR NEW          │
│                  DATABASE SCHEMA                            │
│                        406                                  │
└─────────────────────────────────────────────────────────────┘
                              ↓
┌─────────────────────────────────────────────────────────────┐
│    REPLACE VALUES IN SELECTED SQL QUERY WITH VALUES         │
│           SELECTED FROM NEW DATABASE                        │
│                        408                                  │
└─────────────────────────────────────────────────────────────┘
                              ↓
┌─────────────────────────────────────────────────────────────┐
│  EXECUTE SQL QUERY AGAINST NEW DATABASE AND DETERMINE       │
│   WHETHER SQL QUERY RETURNS AN EMPTY RESULT                 │
│                        410                                  │
└─────────────────────────────────────────────────────────────┘
                              ↓
                        ⟨ EMPTY   ⟩
              YES ←─────⟨ RESULT? ⟩
                        ⟨   412   ⟩
                              ↓ NO
┌─────────────────────────────────────────────────────────────┐
│         STORE SQL QUERY PATTERN TO TRAINING DATA            │
│                          414                                │
└─────────────────────────────────────────────────────────────┘
```

GENERATING TRAINING DATA FOR A MACHINE LEARNING MODEL THAT PERFORMS TEXT-TO-SQL

BACKGROUND

The present invention relates to machine learning, and more specifically, to generating training data for a machine learning model.

Machine learning is a branch of artificial intelligence (AI) and computer sciences, and is the use and development of computer systems that are able to learn and adapt without following explicit instructions. Machine learning uses algorithms and statistical models to analyze and draw inferences from patterns of data. In this regard, machine learning focuses on the use of data and algorithms to imitate the way that humans learn, gradually improving its accuracy.

SUMMARY

A method includes selecting a set of values from a plurality of fields of a table in a first database. The method also can include selecting at least one adverb or adjective for the set of values. The method also can include determining join paths for values in the set of values. The method also can include determining, using a processor, a structured query language pattern based, at least in part, on at least one value in the set of values, the at least one adverb or adjective for the set of values, and the join paths for the set of values. The method also can include storing the structured query language pattern to first training data configured, at least in part, for use in machine learning to train a text-to-SQL model, the text-to-SQL model comprising a first artificial neural network and configured to convert first natural language text to a first structured query language query.

A system includes a processor programmed to initiate executable operations. The executable operations include selecting at least one adverb or adjective for the set of values. The executable operations also can include determining join paths for values in the set of values. The executable operations also can include determining a structured query language pattern based, at least in part, on at least one value in the set of values, the at least one adverb or adjective for the set of values, and the join paths for the set of values. The executable operations also can include storing the structured query language pattern to first training data configured, at least in part, for use in machine learning to train a text-to-SQL model, the text-to-SQL model comprising a first artificial neural network and configured to convert first natural language text to a first structured query language query.

A computer program product includes a computer readable storage medium having program code stored thereon. The program code is executable by a data processing system to initiate operations. The operations include selecting at least one adverb or adjective for the set of values. The operations also can include determining join paths for values in the set of values. The operations also can include determining a structured query language pattern based, at least in part, on at least one value in the set of values, the at least one adverb or adjective for the set of values, and the join paths for the set of values. The operations also can include storing the structured query language pattern to first training data configured, at least in part, for use in machine learning to train a text-to-SQL model, the text-to-SQL model compris-ing a first artificial neural network and configured to convert first natural language text to a first structured query language query.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 4 is a flowchart illustrating an example of a method of generating SQL query patterns for a database using a training corpus.

DETAILED DESCRIPTION

Figure 1:
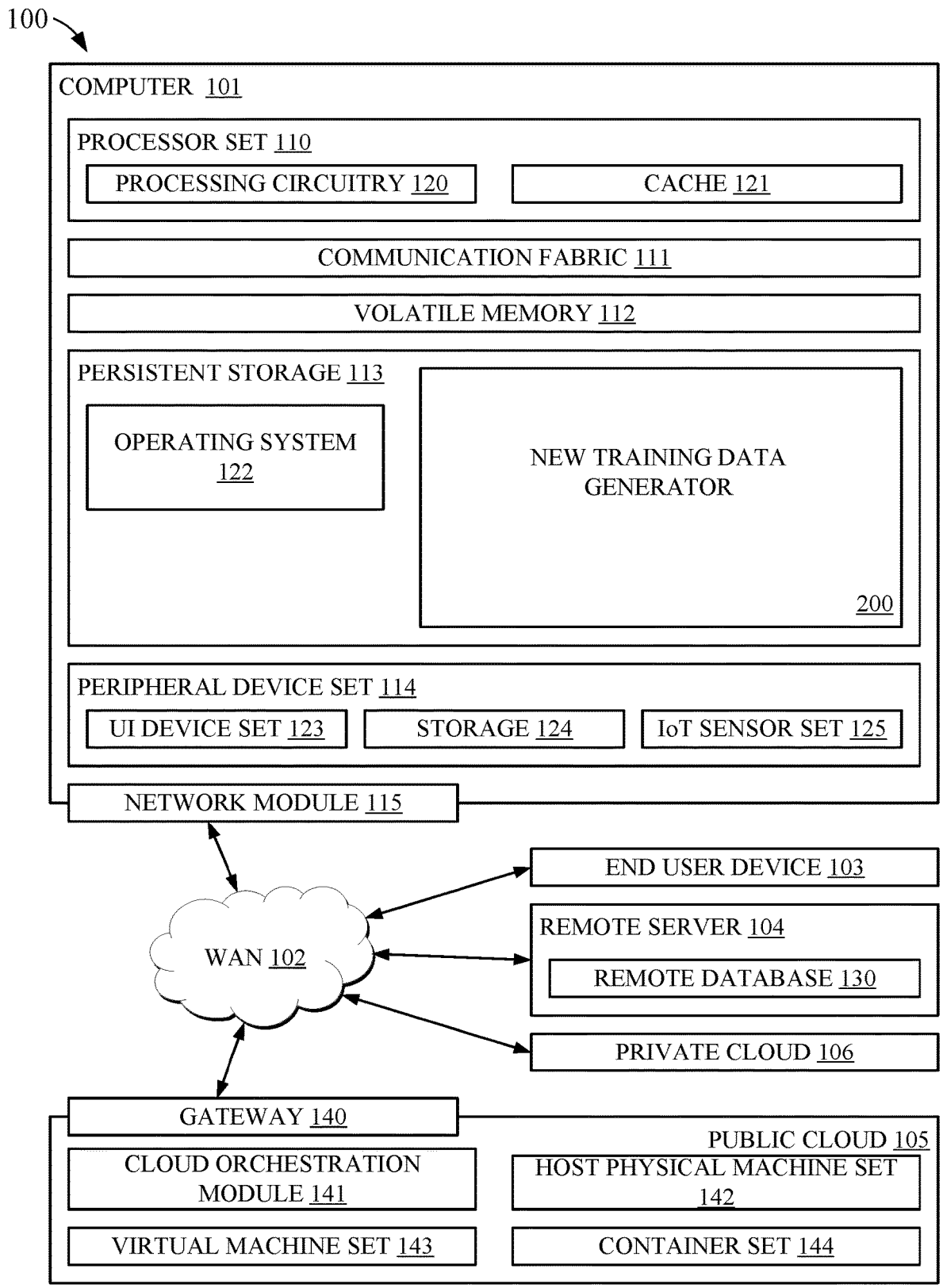
FIG. 1 is a block diagram illustrating an example of a network data processing system.

The arrangements described herein are directed to computer technology, and provide an improvement to computer technology. Specifically, the present arrangements improve automatic generation of training data for Text-to-SQL. Text-to-SQL is a task in natural language processing (NLP) used to automatically generate SQL queries from natural language text. In this regard, Text-to-SQL can transform natural language questions into executable SQL queries. A deep learning (DL) model, which comprises a DL artificial neural network (ANN) with learnable parameters (e.g., weights and biases), can be used to perform Text-to-SQL. The learnable parameters are trained from a data corpus using machine learning. From the perspective of a deep learning (DL) model, Text-to-SQL is a translation process.

A training spider corpus using a development database schema can be used to train a DL model. The accuracy of a DL model trained using a training spider corpus, however, exhibits a significant drop in accuracy when the DL model is run on new database schema in comparison to when the same DL model is run on the development database schema. In this regard, different database schemas typically require different SQL query structures, terms, etc., which presents challenges when trying to use a particular DL model to generate SQL queries for different database schemas. Moreover, training coverage also presents challenges. Training coverage typically needs to be high for each type of database schema to avoid a DL model inferring incorrect patterns. If a DL model is to be used for different database schemas, properly training the DL model for each of the database schemas individually can be computing resource intensive, and thus is not an efficient solution.

The arrangements described herein address these challenges, significantly improving the accuracy of DL models at generating SQL queries for different database (DB) schemas, and doing so in an efficient manner. Accordingly, not only do the arrangements described herein provide improved results, these arrangements also reduce the use of computing resources (e.g., processor operations, local memory access and storage operations, etc.) in comparison to known methods of generating training data for machine learning models that perform Text-to-SQL. Table 1 presents experimental results comparing accuracy of a conventional DL model to a DL model trained in accordance with the arrangements described herein, referred to in Table 1 as "Enhanced DL Model."

TABLE 1

| Database Schema | Conventional DL Model Accuracy | Enhanced DL Model Accuracy |
| --- | --- | --- |
| Development DB | 60% | — |
| Human Resources DB | 19% | 36% |
| Warehouse DB | 15% | 28% |
| Business Intelligence DB | 2% | 38% |

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as new training data generator (hereinafter "training data generator") 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
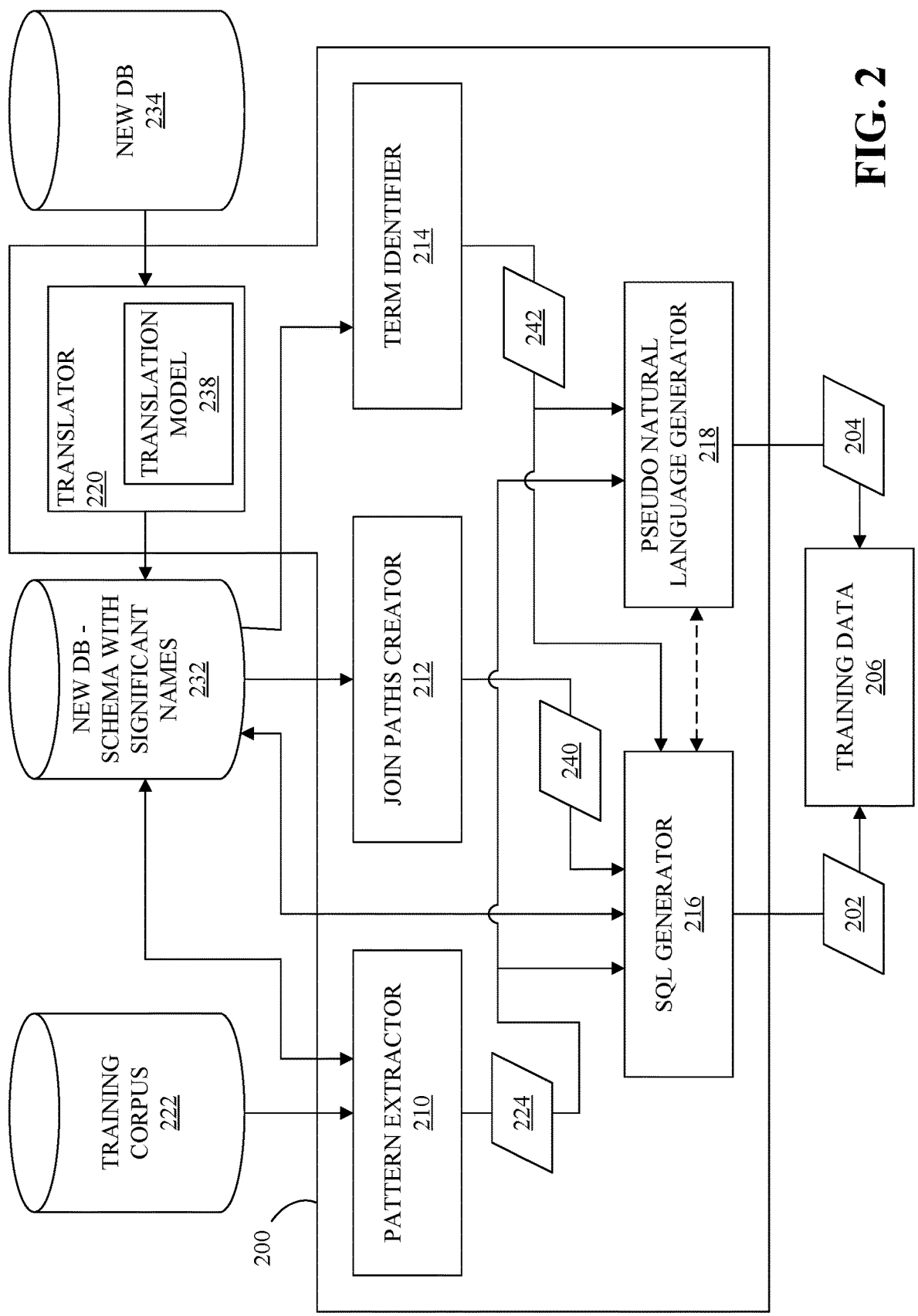
FIG. 2 is a block diagram illustrating example architecture for a training data generator.

FIG. 2 is a block diagram illustrating example architecture for training data generator 200. Training data generator 200 can automatically generate SQL queries 202 from an acquired SQL pattern. Training data generator 200 also can generate questions 204 corresponding to those SQL queries 202. Some of the questions 204 can include more than one sentence. For instance, a first sentence of a question 204 may not reference any elements of a database schema, while other sentences in that question 204 can be short, pre-defined natural language sentences that link each substantive token in the sentence to a specific table and column in the database schema. The following SQL query is an example of an SQL query 202 that can be generated by training data generator 200:

SELECT name from customer where age>56

The following questions is an example of a question 204 can be generated by training data generator 200:

Show me name of customers with age over 56; name is from customer.name; age is from customer.age In the above example, the substantive tokens are "name" in the second sentence and "age" in the third sentence. The sentences in questions 204 need not be grammatically correct in order to be considered adequate for use as machine learning training data. Thus, the sentences included in questions 204 can be pseudo natural language sentences.

Training data generator 200 can output SQL queries 202 and their corresponding questions 204 as training data 206 configured to be used to train a machine learning model that performs Text-to-SQL. Training data 206 can include thousands of pairs, or more, of SQL queries 202 and natural language questions 204.

Training data generator 200 can include a pattern extractor 210, a join paths creator 212, a term identifier 214, an SQL generator 216, a pseudo natural language generator (PNLG) 218 and a translator 220.

Pattern extractor 210 can access a training corpus 222. Training corpus 222 can include a plurality of database schemas. For each database schema, training corpus 222 can include a variety of natural language questions, and unique SQL queries corresponding to the natural language questions, across multiple database tables. Training corpus 222 can include annotations pertaining to questions and/or SQL queries. The annotations can include various types of information pertaining to the SQL, for example what type of SQL components are used in SQL queries, what values are used in SQL queries, how many tables and/or fields are used in a database to which a question and/or SQL query pertain, what types of fields are used in a database to which a question and/or SQL query pertain, a description of a database to which a question and/or SQL query pertain, actual strings recorded in a database to which a question and/or SQL query pertain, etc.

In one or more non-limiting arrangements, the annotations can be generated by users. An example of a dataset that may be used as training corpus 222 is a Spider dataset. Spider is a large-scale complex and cross-domain semantic parsing and text-to-SQL dataset available at https://yale-lily.github.io/spider. Pattern extractor 210 can extract, from training corpus 222, SQL queries and natural language patterns 224. The SQL queries and natural language patterns 224 that are selected can be SQL queries and natural language patterns for a database schema that includes the same type of data as the schema a new database 234. Pattern extractor 210 can communicate SQL queries and natural language patterns 224 to SQL generator 216 and PNLG 218.

Join paths creator 212 and term identifier 214 each can access a schema of a new database 232. The schema of new database 232 can match the general structure of the schema of new database 234, but with one or more table names and/or one or more field names (i.e., column names) changed to terms that are significant (e.g., human understandable). In illustration, names that are obscure (e.g., not natural language terms and/or terms having unclear meaning) can be changed to significant names by translating the obscure names to significant names. By way of example, assume new database 234 includes an employee table, named "empTbl," comprising a date of birth field named "dt_brth" and a hiring date field named "dt_h." For new database 232, the term "empTbl" can be translated to the term "employee", the term "dt_birth" can be translated to the term "date of birth," and the term "dt_h" can be translated to the term "hiring date." By way of further example, assume new database 234 includes a manager table, named "mngTbl," comprising a date of manager name field named "name" and a number of employees led field named "lednr." For new database 232, the term "mngTbl" can be translated to the term "manager," the term "name" can be translated to the term "name of manager," and the term "lednr" can be translated to the term "number of led."

Translator 220 can perform the process of translating table names and field names from new database 234 to significant names in new database 232. Translator 220 can include, for example, a translation model 238 trained using machine learning to perform the translations. In one more arrangements, one or more users can validate the translations, and correct incorrect translations.

In one or more arrangements, translator 220 can perform the translations is a semi-supervised manner. In illustration, translator 220 can identify obscure table names and field names in the schema of new database 234. For any table names and/or field names the translator 220 is not able to translate with at least a threshold level of probability that the translation will be correct, translator 220 can initiate and participate in a dialog with a user in which translator 220 prompts a user to answer questions asked by translator 220. The following dialog is an example of a dialog translator 220 can initiate and in which translator 220 can participate:

Translator question: "What is empTbl?"
User answer: "We use it for employee information."
Translator question: "Is EMPLOYEE a significant name?"
User answer: "Yes."

In this example, responsive to the user answering "Yes," translator 220 can change the name "empTbl" to "employee" in schema of new database 232. If, however, the user answers "No," translator 220 need not change the name in the schema of new database 232. Translation model 238 can be configured, and trained using machine learning, to determine levels of probability that translations are correct.

Join paths creator 212 can create join paths 240 for the schema of new database 232. Join paths 240 can indicate paths joining various fields among various tables in the schema of new database 232. For example, join paths creator 212 can determine join paths based on foreign keys and primary keys, which indicate how tables are linked. Join paths creator 212 can communicate join paths 240 to SQL generator 216, for example in one or more hash tables. An example of a join path is "from product join manufacturer on product.product_id=manufacturer.product_id." SQL generator 216 can use join paths 240 when generating SQL queries.

Term identifier 214 can, for example using corpus analysis, identify (or create) compound nouns for fields in the schema of new database 232, identify adjectives and adverbs pertaining to tables and field in the schema of new database 232, identify adjectives and adverbs pertaining to the compound nouns, and identify logical conjunctions (e.g., not, except, exclude, and, or, etc.) for noun phrases. Corpus analysis is a linguistic approach to analyzing a corpus of data. Term identifier 214 can communicate the compound nouns, adjectives, adverbs and logical conjunctions, as natural language terms 242, to PNLG 218. For example, term identifier 214 can store natural language terms 242 in one or more hash tables, and communicate the hash table(s) to PNLG 218.

A compound noun is a phrase comprising at least two nouns, and may include one or more other words. Term identifier 214 can identify/create a plurality of compound nouns for one or more fields in the schema of new database 232. By way of example, assume a table for employees includes a field that indicates employees' managers. For that field, term identifier 214 can create the compound nouns "manager of employee," "employee's manager," "supervisor of employee," "employee's supervisor," etc. As another example, assume a table includes a field that indicates height (e.g., a field named "height"). For that field, term identifier 214 can identify adjectives such as "tall," "tallest," "large," "largest," "short," "shortest," "small," "smallest," etc. As a further example, assume a table includes a field that indicates a date (e.g., a field named "date of employment"). For that field, term identifier 214 can identify adverbs such as "before," "after," "since," etc.

SQL generator 216 can receive SQL queries and natural language patterns 224 from pattern extractor 210 and receive join paths 240 from join paths creator 212. Based on SQL queries and natural language patterns 224, and join paths 240, SQL generator 216 can generate SQL queries 202 for the schema of new database 232. SQL generator 216 can include SQL queries 202 in training data 206.

In one or more arrangements, SQL generator 216 can access new database 232 and randomly select a table, as well as fields of that table. SQL generator 216 also can receive join paths 240. Based on new selected table and fields of the database 232 and join paths 240, SQL generator 216 can generate SQL queries 202 for new database 232. SQL generator 216 can include those SQL queries 202 in training data 206.

PNLG 218 can receive SQL queries and natural language patterns 224 from pattern extractor 210, and receive natural language terms 242 from term identifier 214. Based on SQL queries and natural language patterns 224, and natural language terms 242, PNLG 218 can generate questions 204 corresponding to SQL queries 202. Each question 204 can include one or more pseudo natural language sentences. To generate the pseudo natural language sentences, PNLG 218 can implement natural language processing (NLP). For example, using NLP, PNLG 218 can combine natural language terms 242 with other natural language terms and/or natural language phrases to generate the pseudo natural language sentences. NLP is a field of computer science, artificial intelligence and linguistics which implements computer processes to facilitate interactions between computer systems and human (natural) languages. PNLG 218 can include those questions 204 in training data 206.

In one or more arrangements, PNLG 218 can access the schema of new database 232 and receive natural language terms 242. Based on the schema of new database 232 and natural language terms 242, PNLG 218 can generate questions 204 corresponding to SQL queries 202. PNLG 218 can include those questions 204 in training data 206.

Figure 3:
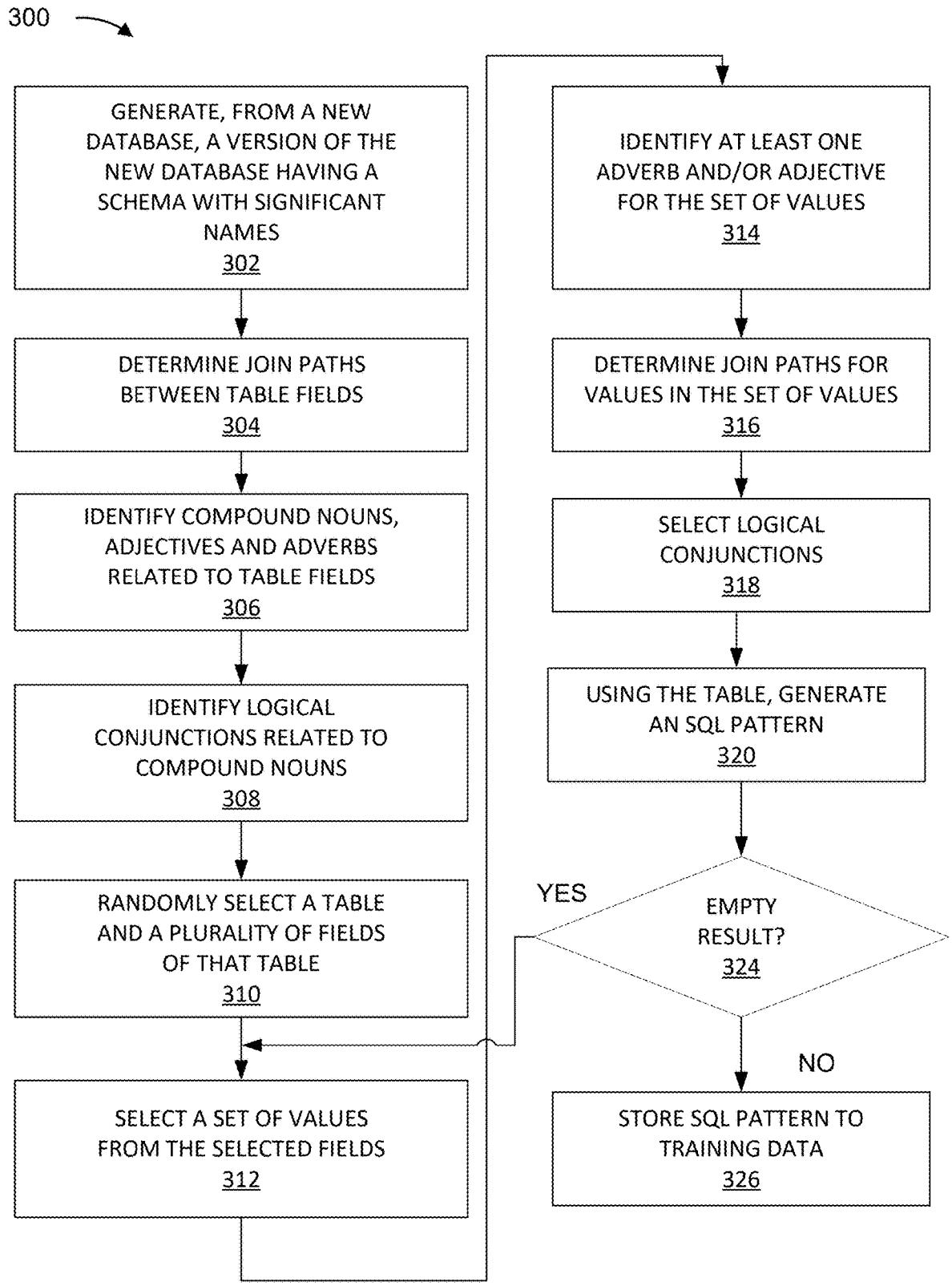
FIG. 3 is a flowchart illustrating an example of a method of generating structured query language (SQL) query patterns for a database.

FIG. 3 is a flowchart illustrating an example of a method 300 of generating SQL query patterns for a database. Method 300 can be implemented by training data generator 200.

At step 302 training data generator 200 can generate, from a new database 234, another new database 232. The database 232 can be a version of the database 234, but having a database schema with significant names. In illustration, translator 220 can access and read the schema of database 234, and use translation model 238 to generate new database 232 having a schema with significant names, for example as previously described. By way of example, translator 220 can copy database 234 to create database 232 but, using translator 220, change one or more field names in database 232 to significant names during the copy process or after copying database 234. Training data generator 200 can read the database schema with significant names.

At step 304 training data generator 200 can determine join paths between fields of tables in database 232. In illustration, join paths creator 212 can determine join paths based on foreign keys and primary keys, and create join paths 240, for example as previously described.

At step 306 training data generator 200 can identify compound nouns, adjectives and adverbs related to the fields of the tables. In illustration, term identifier 214 can identify and/or create a plurality of compound nouns for one or more fields in the schema of new database 232, identify adjectives and adverbs pertaining to the compound nouns, and identify logical conjunctions for noun phrases, for example as previously described.

At step 308 training data generator 200 can identify logical conjunctions related to the compound nouns. In illustration, term identifier 214 can identify logical conjunctions for noun phrases, for example as previously described. Term identifier 214 can output the compound nouns, adjectives, adverbs and logical conjunctions as natural language terms 242.

At step 310 training data generator 200 can randomly select a table from new database 232 and a plurality of fields of that table. In illustration, SQL generator 216 can randomly select the table and fields.

At step 312 training data generator 200 can select a set of values from the selected fields. In illustration, SQL generator 216 can randomly select the set of values.

At step 314 training data generator 200 can identify at least one adverb and/or adjective for the selected set of values. In illustration, SQL generator 216 can identify the adverb(s) and/or adjective(s) from natural language terms 242 determined by term identifier 214 for the selected table and/or fields. By way of example, adverbs for a date can include, but are not limited to, "before," "after," "since," etc. Adjectives for an age can include, but are not limited to, "older," "younger," etc. Adjectives for a price can include, but are not limited to, "expensive," "cheap," "maximum," "minimum," etc.

At step 316 training data generator 200 can determine join paths for values in the selected set of values. In illustration, SQL generator 216 can determine the join paths, from join paths 240 generated by join paths creator 212, that join the fields from which the values are selected with other fields, such as fields in other tables.

At step 318 training data generator 200 can identify logical conjunctions pertaining to the selected values. In illustration, SQL generator 216 can identify logical conjunctions, from natural language terms 242, that pertain to the selected values. For example, SQL generator 216 can identify logical conjunctions for the noun phrases that are identified for the fields from which the values are selected. Examples of logical conjunctions include, but are not limited to, "not," "except," "exclude," "and," "or," etc.

At step 320 training data generator 200 can, using the selected table, generate an SQL pattern. In illustration, SQL generator 216 can generate the SQL pattern based, at least in part, on the selected table, at least one of the selected fields, at least one value, in the set of values, selected from the selected field(s), and the identified adverb(s) and/or adjective(s). SQL generator 216 can generate the SQL pattern further based on the identified compound nouns and logical conjunctions related to the compound nouns. The SQL pattern can be, for example, in the form "select S where W," wherein S is a selected field and W is a condition. The condition can be, for example, an adjective or adverb combined with at least one noun. By way of example, assume the selected field S="product.price." Also assume the condition W includes the value "Acme," in addition to the adverb "most," the adjective "expensive" and the noun "price," which form the phrase "most expensive price." The determined join paths can indicate joins to other tables/fields in the SQL query. For this example, SQL generator 216 can generate the SQL pattern as follows:

```
SELECT max(T1.PRICE) FROM PRODUCTS AS T1 JOIN
MANUFACTURERS AS T2 ON
T1.MANUFACTURER_ID=T2.MANUFACTURER_ID WHERE
T2.NAME='ACME'
```

At step 322 training data generator 200 can determine whether the determined SQL pattern returns an empty result. In illustration, SQL generator 216 can query the new database 232 using the determined SQL pattern. By way of example, SQL generator 216 can generate a query using the determined SQL query pattern and execute that query against new database 232. New database 232 can return a result for the SQL query. If new database 232 does not identify values corresponding to the SQL query, the result can be an empty result (e.g., a result without any values from new database 232).

At decision box 324, if the determined SQL pattern returns an empty result, training data generator 200 can return to step 312. Training data generator 200 can iterate steps 312 through 322 until a non-empty result is returned for the determined SQL pattern, or until a threshold number of iterations have been performed.

If the determined SQL pattern returns a non-empty result, at step 326 training data generator 200 can store the SQL pattern to training data 206. In illustration, SQL generator 216 can store the SQL query having the SQL pattern, as new training data, to training data 206.

FIG. 4 is a flowchart illustrating an example of a method 400 of generating SQL query patterns for a database using a training corpus. Method 400 can be implemented by training data generator 200.

At step 402 training data generator 200 can select, from training corpus 222, a database schema that includes a same type of data as new database 232. In illustration, pattern extractor 210 can identify a plurality of fields in the schema of new database 232, and determine the type of data for those fields (e.g., varchar, date, integer, etc.). Pattern extractor 210 can select, from training corpus 222, a database schema having fields for that same type of data. By way of example, pattern extractor 210 can select a database schema that, from among the database schemas in training corpus 222, has a greatest number of fields for which the data types are the same as data types in fields of new database 232. Fields of a database schema and new database 232 that have the same type of data can be considered to correlate to one another.

At step 404 training data generator 200 can select a SQL query from training data for the database schema selected from training corpus 222. In illustration, pattern extractor 210 can select a SQL query that queries fields of the selected database schema that correlate to fields of new database 232. Pattern extractor 210 can communicate the selected SQL query to SQL generator 216.

At step 406 training data generator 200 can replace, in the selected SQL query, table and field names with corresponding table and field names from the schema of new database 232. In illustration, SQL generator 216 can replace the names of fields in the SQL query with names of correlating fields in the schema of new database 232. Further, SQL generator 216 can replace the names of tables in the SQL query with the names of tables in the schema of new database 232 that have correlating fields.

At step 408 training data generator 200 can replace values in the selected SQL query with values selected from new database 232. In illustration, SQL generator 216 can identify in the selected SQL query values assigned to fields, identify in new database 232 fields that correlate with those fields of the SQL query, and replace the values assigned to the fields in the SQL query with values randomly selected from the correlating fields of new database 232.

By way of example, assume the SQL query selected from training corpus 222 is as follows:
SELECT singer.name where singer.concert_date>(select singer.concert_date where singer.name="Oliver")

Also assume that the field named "singer.concert_date" has a "date" data type and the field named "singer.name" has a "name" data type. Further, assume that new database 232 has a field named "employee.birth_date" that has a "date" data type and a field named "employee.name" that has a "name" data type. The field "employee.birth_date" can be determined to correlate to the field "singer.concert_date," and the field "employee.name" can be determined to correlate to the field "singer.name." Accordingly, the names "singer.concert_date" and "singer.name" in the selected SQL query can be replaced with the names "employee.birth_date" and "employee.name," respectively, for example as follows:
SELECT employee.name where employee.birth_date> (select employee.birth_date where employee.name="Jack London")

At step 410 training data generator 200 can execute the SQL query against new database 232 and determine whether the SQL query returns an empty result. In illustration, SQL generator 216 can execute the SQL query against new database 232 and determine whether the SQL query returns an empty result.

At decision box 412, if execution of the SQL query returns an empty result, training data generator 200 can return to step 408. Training data generator 200 can iterate steps 408 through 410 until a non-empty result is returned for the SQL query, or until a threshold number of iterations have been performed.

If the SQL query returns a non-empty result, at step 414 training data generator 200 can store the SQL query to training data 206. In illustration, SQL generator 216 can store the SQL query, as new training data, to training data 206. Storing the SQL query to training data 206 can be responsive to the following: replacing, in the selected SQL query, table and field names with corresponding table and field names from the schema of new database 232; replacing values in the selected SQL query with values selected from new database 232; and the SQL query not returning a non-empty result.

Figure 5:
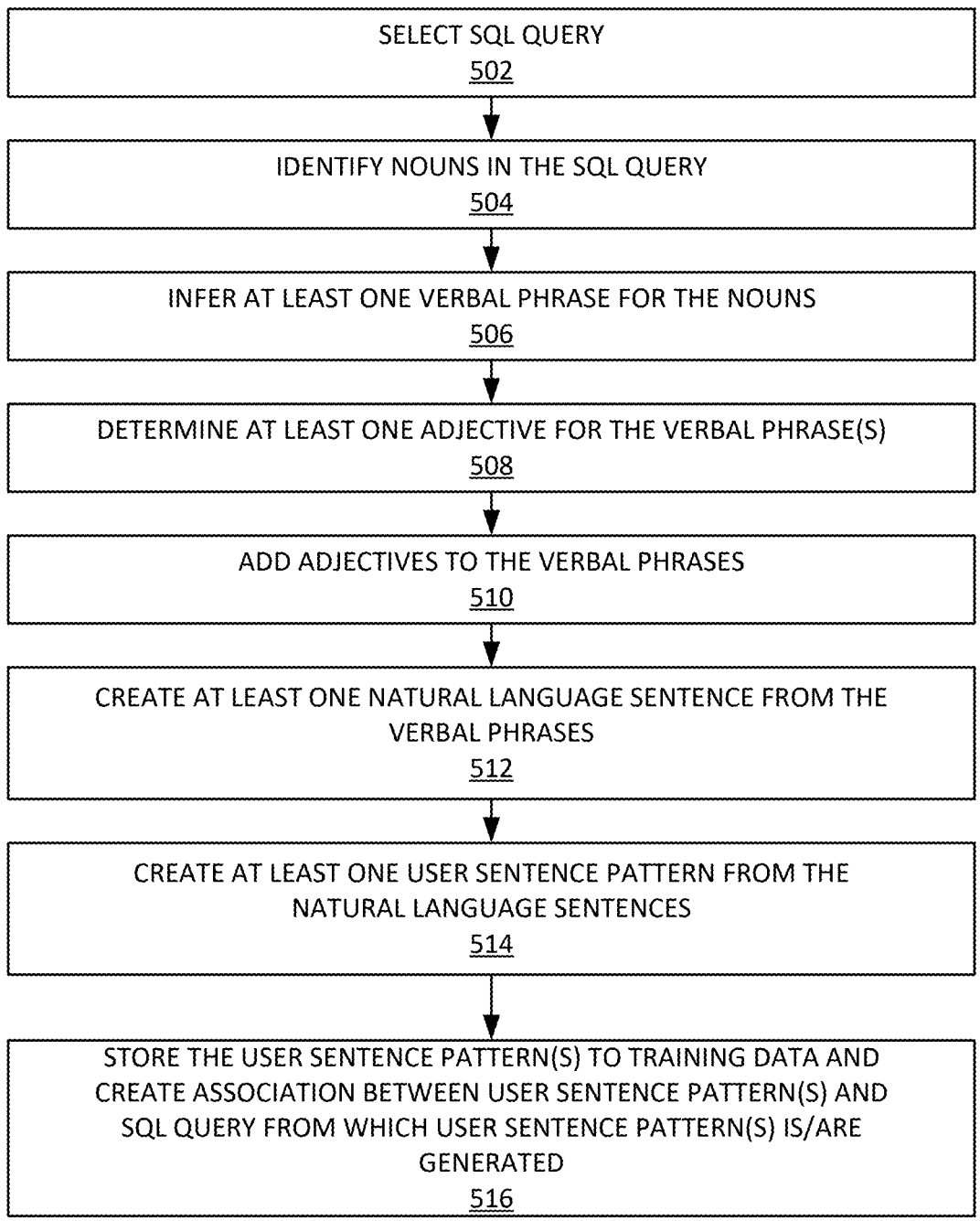
FIG. 5 is a flowchart illustrating an example of a method of generating questions for SQL queries.

FIG. 5 is a flowchart illustrating an example of a method 500 of generating questions for SQL queries. Method 500 can be implemented by training data generator 200.

At step 502 training data generator 200 can select an SQL query from training data 206. In illustration, pattern extractor can select a SQL query generated by SQL generator 216 or a SQL query in which table and/or field names were changed by SQL generator 216.

At step 504 training data generator 200 can identify nouns in the SQL query. In illustration, PNLG 218 can identify nouns in the SQL query using NLP. By way of example, assume the SQL query selected from training corpus 222 is as follows:

SELECT max(T1.PRICE) FROM PRODUCTS AS T1 JOIN MANUFACTURERS AS T2 ON T1.MANUFACTURER_ID=T2.MANUFACTURER_ID WHERE T2.NAME='ACME'

From that query, PNLG 218 can identify the nouns "product," "price" and "manufacturer."

At step 506 training data generator 200 can infer one or more verbal phrases for the nouns. In illustration, PNLG 218 can infer one or more verbal phrases for the nouns using NLP. Each verbal phrase can comprise at least one verb. For example, for the nouns "product," "price" and "manufacturer" PNLG 218 can infer the following verbal phrases:
Manufacturer sell products with price
Price of products manufacturer sells
Manufacturer product price
. . .

At step 508 training data generator 200 can determine one or more adjectives for the verbal phrase(s). In illustration, PNLG 218 can determine adjectives for the verbal phrase(s) using NLP. For instance, for verbal phrase "Shop sell products with price," PNLG 218 can determine the adjectives "less," "lower," "greater," "most expensive," etc.

At step 510 training data generator 200 can add the adjective(s) to the verbal phrase(s). In illustration, using NLP, PNLG 218 can add the adjective(s) to the verbal phrase(s). Continuing with the previous example for the verbal phrase "Customer bought products with price," PNLG 218 can add the adjectives to form the following verbal phrases:
Manufacturer sell products with price less than
Manufacturer sell products with price lower than
Manufacturer sell products with price greater than
Manufacturer's most expensive product has price
. . .

At step 512 training data generator 200 can create one or more natural language sentences from the verbal phrase(s). In illustration, PNLG 218 can create the natural language sentences using NLP. The following sentence is an example of a natural language sentences created from the example verbal phrases:
Show the most expensive product for Acme At step 514 training data generator 200 can create one or more user sentence patterns from the natural language sentence(s). In illustration, PNLG 218 can create the following user sentence pattern from the example natural language sentence:
She me QUANTITY with NAME of MANUFACTURERS being
'Acme' and PRODUCT_TYPE of PRODUCT being 'hammer'

In this example, "MANUFACTUERERS" AND "PRODUCT" can be table names, "QUANTITY" and "NAME" can be a field names in the table "MANUFACTURERS," and "PRODUCT_TYPE" can be a field name in table "PRODUCT."

At step 516 training data generator 200 can store the user sentence pattern(s) to training data 206 and create, in training data 206, associations between the user sentence pattern(s) and the SQL query from which the user sentence pattern(s) is/are generated. In illustration, PNLG 218 can store the user sentence patterns to training data 206 and create, in training data 206, associations between the user sentence patterns and the SQL query from which the user sentence patterns are generated.

Figure 6:
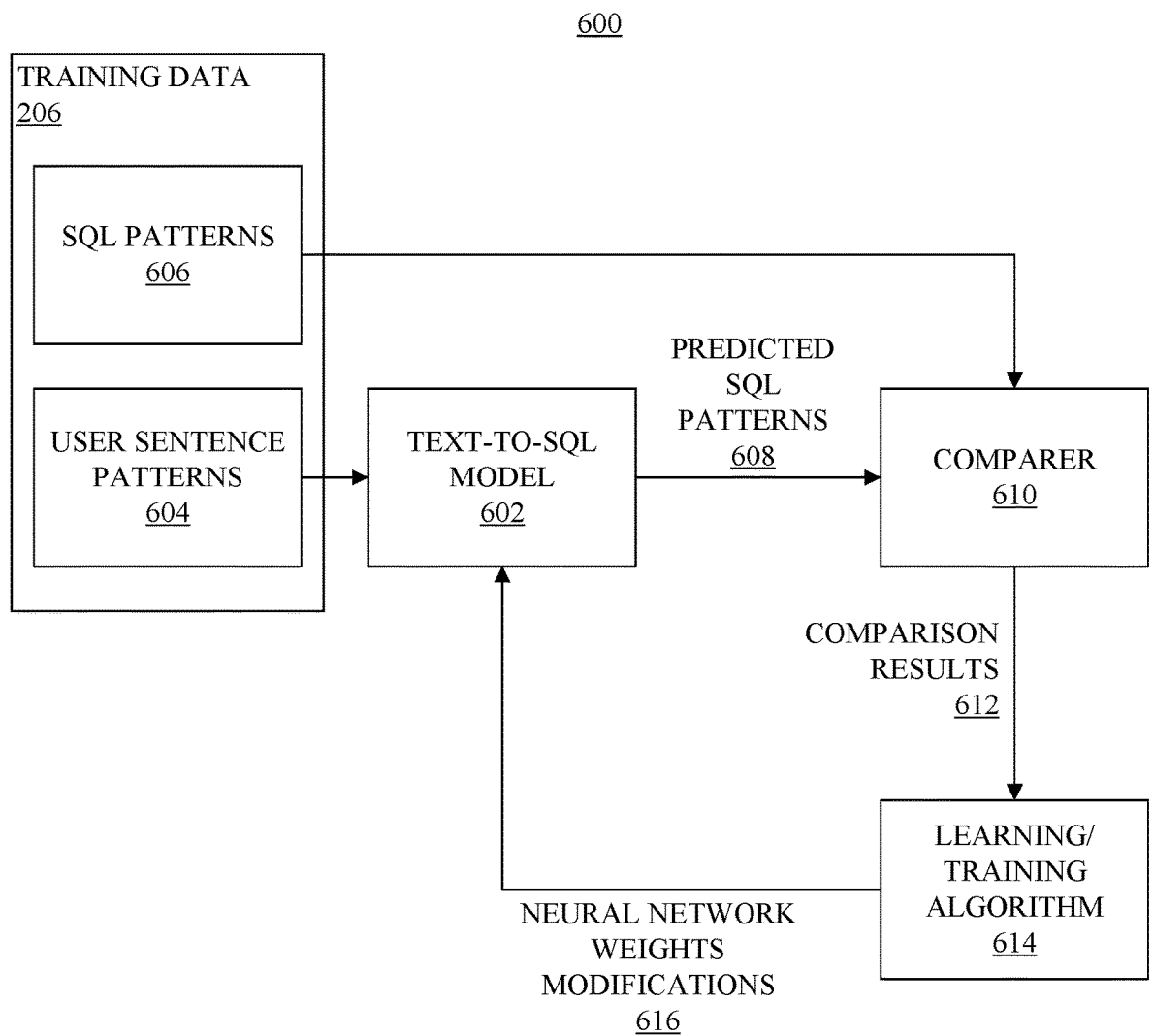
FIG. 6 depicts an artificial intelligence machine learning process of training a text-to-SQL model.

FIG. 6 depicts an artificial intelligence machine learning process 600 of training a text-to-SQL model 602 using training data 206. Process 600 can be implemented by computer 101, or another suitable data processing system, to train text-to-SQL model 602 to translate user sentence patterns to SQL patterns. Text-to-SQL model 602 can include an artificial neural network (ANN).

Training data 206 can include user sentence patterns 604 and SQL patterns 606 associated with user sentence patterns 604. User sentence patterns 604 can be input to a text-to-SQL model 602 that is being trained. Text-to-SQL model 602 can process user sentence patterns 604 and, based on such processing, generate predicted SQL patterns 608. A comparer 610 can compare the predicted SQL patterns 608 to SQL patterns 606 and, based on the comparison, generate comparison results 612. Learning/training algorithm 614 can process/analyze the comparison results 612 to determine neural network weights modifications 616. Learning/training algorithm 614 can use the neural network weights modifications 616 to modify neural network parameter weightings used in text-to-SQL model 602. The process can iterate until the generated comparison results 612 satisfy specified criteria.

Figure 7:
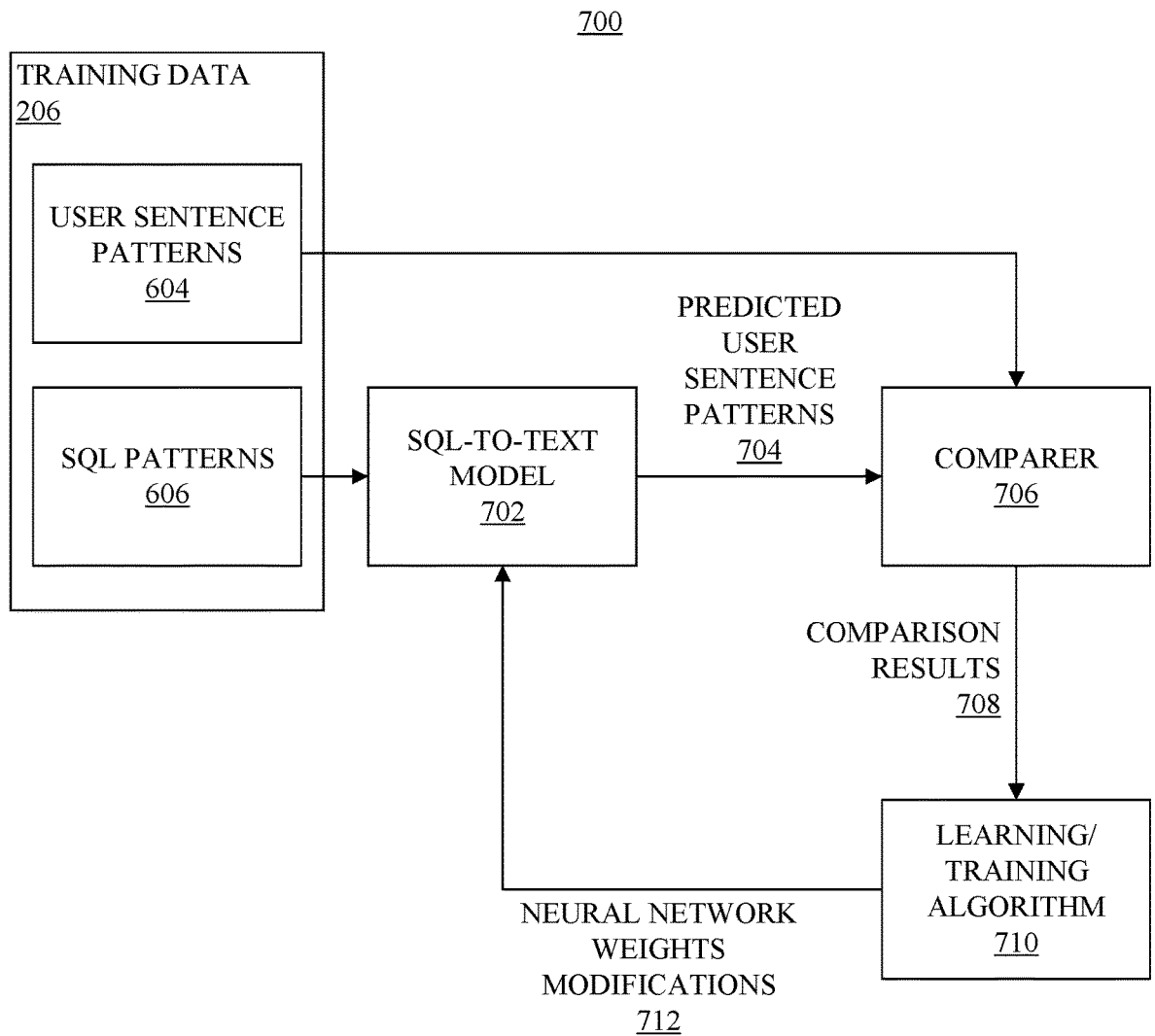
FIG. 7 depicts an artificial intelligence machine learning process of training a SQL-to-text model.

FIG. 7 depicts an artificial intelligence machine learning process 700 of training a SQL-to-text model 702 using training data 206. Process 700 can be implemented by computer 101, or another suitable data processing system, to train SQL-to-text model 702 to translate SQL patterns to user sentence patterns. SQL-to-text model 702 can include an artificial neural network (ANN).

As noted, training data 206 can include user sentence patterns 604 and SQL patterns 606 associated with user sentence patterns 604. SQL patterns 606 can be input to a SQL-to-text model 702 that is being trained. SQL-to-text model 702 can process SQL patterns 606 and, based on such processing, generate predicted user sentence patterns 704. A comparer 706 can compare the predicted user sentence patterns 704 to user sentence patterns 604 and, based on the comparison, generate comparison results 708. Learning/training algorithm 710 can process/analyze the comparison results 708 to determine neural network weights modifications 712. Learning/training algorithm 710 can use the neural network weights modifications 712 to modify neural network parameter weightings used in SQL-to-text model 702. The process can iterate until the generated comparison results 708 satisfy specified criteria.

Figure 8:
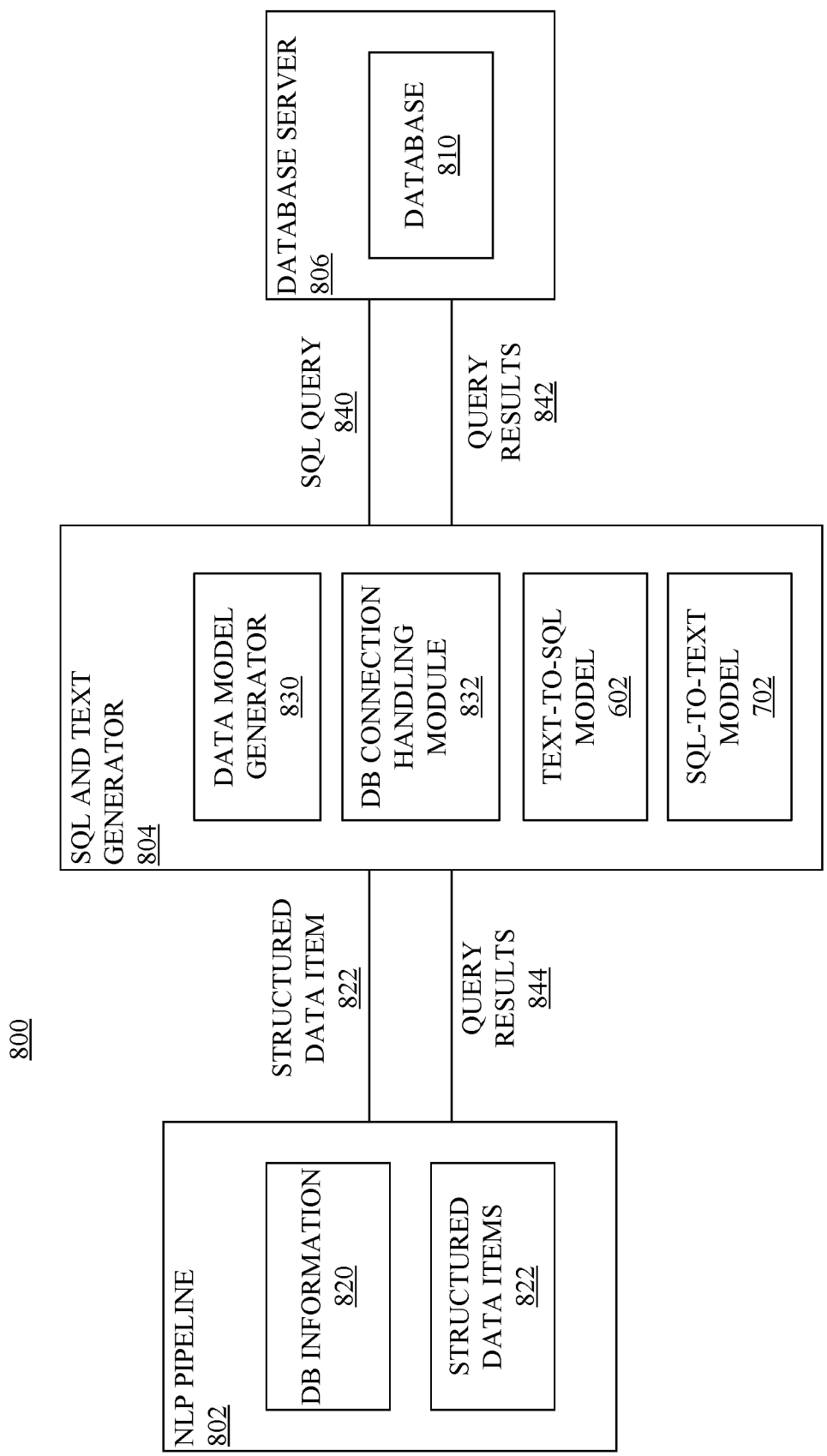
FIG. 8 depicts a data processing environment.

FIG. 8 depicts a data processing environment 800 in which text-to-SQL model 602 and SQL-to-text model 702, trained using training data 206, can be implemented. Data processing environment 800 can include a NLP pipeline 802, a SQL and text generator 804 and a database server 806 hosting a database 810.

NLP pipeline 802 can include database information 820 for database 810 and structured data items 822. Database information 820 can include information pertaining to database 810, for example database schema (e.g., tables, fields, data types, etc.), foreign keys, primary keys, references to tables, references to values, etc. Structured data items 822 can include data items extracted from user queries.

SQL and text generator 804 can include a data model generator 830, a database connection handling module 832, text-to-SQL model 602 and SQL-to-text model 702. In operation, SQL and text generator 804 can receive database information 820 from NLP pipeline 802. Based on database information 820, data model generator 830 can create a data model for database 810, for example in a hash table. The data model can be a graph in which each node represents a table of database 810 and edges between nodes represent foreign and primary keys connecting tables. Database connection handling module 832 can establish a connection to database 810 and log into database 810.

SQL and text generator 804 can receive a structured data item 822 from NLP pipeline 802. The structured data item 822 can include, for example, a user query in the form of a natural language sentence, such as a question, received from a client device (not shown). Text-to-SQL model 602 can convert the structured data item into an SQL query 840. By way of example, text-to-SQL model 602 can generate the following is a SQL query 840 from the user query "How many Acme products are sold each year?":

```
select : [SALES_DETAILS].[QUANTITY] : total
select sum(sales_details.quantity) as
SALES_DETAILS_QUANTITY,
filter : [MANUFACTURERS].[NAME] : equals : "Acme"
where manufacturers.name='Acme'
groupBy : [SALES].[YEAR]
select year(sales.date) as SALES_YEAR
group by year(sales.date)
select sum(sales_details.quantity) as
SALES_DETAILS __ QUANTITY, year(sales.date) as
SALES YEAR
from manufacturers
    inner join products products
        on
manufacturers.manufacturer_id=products.manufacturer_id
    inner join sales_details
        on products.product_id=sales_details.product_id
    inner join sales
        on sales_details.sales_id=sales.sales_id
where manufacturers.name='Acme'
group by year(sales.date)
```

As another example, text-to-SQL model 602 can generate the following is a SQL query 840 from the user query "What is the name of customer who bought the most phone's in 2015?":

```
QUERY1
    select : [SALES_DETAILS].[QUANTITY] : total
    filter : [PRODUCTS]. [TYPE] : equals : "phone"
    filter : [SALES].[YEAR] : equals : "2015"
    groupBy : [CUSTOMERS].[NAME]
QUERY2
    select : [query1].[SALES_DETAILS].[QUANTITY] :
    maximum
QUERY3
    select : [query1].[CUSTOMERS][NAME]
    join: [query2].[SALES_DETAILS][QUANTITY] :
    [query1].[SALES_DETAILS][QUANTITY] : equals
WITH
    query1 as (
        select sum(sales_details.quantity) as
            SALES_DETAILS_QUANTITY ,
            customers.name as CUSTOMERS __ NAME ,
            year(sales.date) as SALES __ YEAR, products.type as
            PRODUCTS __ TYPE
        from products products inner join sales_details
            sales_details on
            [roducts.product_id=sales_details.product_id
            inner join sales on sales_details.sales_id=sales.sales_id
            inner join customers on
            sales.customer_id=customers.customer_id
        where year(sales.date)='2015' and products.type='phone'
        group by customers.name, year(sales.date), products.type ),
```

```
    query2 as (
      select max(query1.sales_details_quantity) as
        SALES_DETAILS_QUANTITY from query1 )
  select query1.customers_name as CUSTOMERS_NAME
  from query1 inner join query2 on
    query2.SALES_DETAILS_QUANTITY =
    query1.SALES_DETAILS_QUANTITY
  group by query1.customers_name
```

SQL and text generator 804 can execute SQL query 840 against database 810. In response, database 810 can generate query results 842 can communicate query results 842 to SQL and text generator 804. In turn, SQL and text generator 804 can communicate query results 844 to NLP pipeline 802, via which query results 844 can be communicated to a client device for presentation to the user who provided the user query. The query results 842, 844 can include data accessed from database 810 by SQL query 840.

In one or more arrangements, query results 844 also can include a restatement in natural language of the user query provided by the user. In illustration, SQL-to-text model 702 can convert SQL query 840 to natural language text, and SQL and text generator 804 can include that natural language text in query results 844. Accordingly, the user can review the natural language text in query results 844 to confirm whether that natural language text corresponds to the user query. If so, the user can be assured that the database data in query results 844 is a valid response the user query. If the natural language text in query results 844 does not correspond to the user query, the user can rephrase the query in order to access the data the user is attempting to access.

In this regard, the goal of the SQL and text generator 804 is to describe SQL query 840 in natural language so that the user can have an idea whether the answers retrieved are correct or not. SQL and text generator 804 can translate pseudo-SQL into natural language using the machine learning trained SQL-to-text model 702. For example, assume a user asks "What revenue was generated by Acme in 2019?" Without use of training data 206 to train SQL-to-text model 702, SQL and text generator 804 may respond with "you are asking about the ww client name of cust client dtls and total revenue of v ai rev cust dtl where ww client name of cust client dtls is equal to ACME and acct year of v ai rev cust dtl is equal to 2019." However, using SQL-to-text model 702 trained using training data 206, SQL and text generator 804 may respond with "you are asking about the client name and total client revenue where client name is equal to ACME and acct year is equal to 2019." The latter response is more clear and understandable to the user.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As defined herein, the term "natural language" means a language spoken and written by humans that has emerged naturally over multiple centuries, or longer, by a process of use, repetition, and change. Examples of a "natural language" include, but are not limited to, English, Spanish, German, and the like. As the term "natural language" is defined herein, computer programming languages are not natural languages.

As defined herein, the term "pseudo natural language question" is a question written in a natural language, wherein the question need not be grammatically correct.

As defined herein, the term "text-to-SQL model" means a model, comprising an artificial neural network, configured to convert natural language text to an SQL query.

As defined herein, the term "SQL-to-text model" means a model, comprising an artificial neural network, configured to convert an SQL query to natural language text.

As defined herein, the term "significant name" means a name, assigned to a table or field in a database, that is clearly descriptive of content of the table or field and that is meaningful to an organization.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "output" means storing in memory elements, writing to display or other peripheral output device, sending or transmitting to another system, exporting, or similar operations.

As defined herein, the term "user" means a person (i.e., a human being).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   generating a first database from a second database by replacing a plurality of field names in the first database with significant names;
   selecting a set of values from a plurality of fields of a table in the first database;
   selecting at least one adverb or adjective for the set of values;
   determining join paths for values in the set of values;
   determining, using a processor, a structured query language (SQL) pattern based, at least in part, on at least one value in the set of values, the at least one adverb or adjective for the set of values, and the join paths for the set of values; and
   storing the structured query language pattern to first training data configured, at least in part, for use in machine learning to train a text-to-SQL model, the text-to-SQL model comprising a first artificial neural network and configured to convert first natural language text to a first structured query language query;
   selecting a second structured query language query;
   identifying nouns in the second structured query language query;
   inferring at least one verbal phrase for the nouns in the second structured query language query;
   creating at least one natural language sentence from the at least one verbal phrase for the nouns in the second structured query language query;
   creating at least one user sentence pattern from the at least one natural language sentence; and
   storing the at least one user sentence pattern to the first training data,
   wherein the first training data further is configured for use in machine learning to train a SQL-to-text model, the SQL-to-text model comprising a second artificial neural network and configured to convert the first structured query language query to second natural language text.

2. The method of claim 1, further comprising:
   identifying compound nouns related to the fields of the table; and
   identifying logical conjunctions related to the compound nouns;
   wherein determining the structured query language pattern further is based on the compound nouns and logical conjunctions related to the compound nouns.

3. The method of claim 1, further comprising:
   selecting, from a training corpus, a second database schema that includes a same type of data as a first database schema of the first database;
   selecting the second structured query language query from second training data for the second database schema;
   replacing, in the second structured query language query, table and field names with table and field names for the first database schema;
   replacing, in the second structured query language query, second values with first values selected from the first database; and
   responsive to the replacing, in the second structured query language query, the table and field names with the table and field names for the first database schema, and responsive to the replacing, in the second structured query language query, the second values with the first values selected from the first database, storing the second structured query language query to the first training data.

4. The method of claim 3, further comprising:
executing the second structured query language query against the first database; and
determining whether the executing the second structured query language query against the first database returns an empty result;
wherein the storing the second structured query language query to the first training data further is responsive to the executing the second structured query language query against the first database not returning the empty result.

5. The method of claim 1, further comprising: determining at least one adjective for the at least one verbal phrase; and adding the at least one adjective to the at least one verbal phrase.

6. A system, comprising:
a processor programmed to initiate executable operations comprising:
generating a first database from a second database by replacing a plurality of field names in the first database with significant names;
selecting a set of values from a plurality of fields of a table in the first database;
selecting at least one adverb or adjective for the set of values;
determining join paths for values in the set of values;
determining a structured query language (SQL) pattern based, at least in part, on at least one value in the set of values, the at least one adverb or adjective for the set of values, and the join paths for the set of values;
storing the structured query language pattern to first training data configured, at least in part, for use in machine learning to train a text-to-SQL model, the text-to-SQL model comprising a first artificial neural network and configured to convert first natural language text to a first structured query language query;
selecting, from a training corpus, a second database schema that includes a same type of data as a first database schema of the first database;
selecting a second structured query language query from second training data for the second database schema;
replacing, in the second structured query language query, table and field names with table and field names for the first database schema;
replacing, in the second structured query language query, second values with first values selected from the first database; and
responsive to the replacing, in the second structured query language query, the table and field names with the table and field names for the first database schema, and responsive to the replacing, in the second structured query language query, the second values with the first values selected from the first database, storing the second structured query language query to the first training data.

7. The system of claim 6, the executable operations further comprising:
identifying compound nouns related to the fields of the table; and
identifying logical conjunctions related to the compound nouns;

wherein determining the structured query language pattern further is based on the compound nouns and logical conjunctions related to the compound nouns.

8. The system of claim 6, the executable operations further comprising:
executing the second structured query language query against the first database; and
determining whether the executing the second structured query language query against the first database returns an empty result;
wherein the storing the second structured query language query to the first training data further is responsive to the executing the second structured query language query against the first database not returning the empty result.

9. The system of claim 6, the executable operations further comprising:
identifying nouns in the second structured query language query;
inferring at least one verbal phrase for the nouns in the second structured query language query;
creating at least one natural language sentence from the at least one verbal phrase for the nouns in the second structured query language query;
creating at least one user sentence pattern from the at least one natural language sentence; and
storing the at least one user sentence pattern to the first training data;
wherein the first training data further is configured for use in machine learning to train a SQL-to-text model, the SQL-to-text model comprising a second artificial neural network and configured to convert the first structured query language query to second natural language text.

10. The system of claim 9, the executable operations further comprising:
determining at least one adjective for the at least one verbal phrase; and
adding the at least one adjective to the at least one verbal phrase.

11. A computer program product, comprising:
one or more computer readable storage mediums having program code stored thereon, the program code stored on the one or more computer readable storage mediums collectively executable by a data processing system to initiate operations including:
generating a first database from a second database by replacing a plurality of field names in the first database with significant names;
selecting a set of values from a plurality of fields of a table in the first database;
selecting at least one adverb or adjective for the set of values;
determining join paths for values in the set of values;
determining a structured query language (SQL) pattern based, at least in part, on at least one value in the set of values, the at least one adverb or adjective for the set of values, and the join paths for the set of values;
storing the structured query language pattern to first training data configured, at least in part, for use in machine learning to train a text-to-SQL model, the text-to-SQL model comprising a first artificial neural network and configured to convert first natural language text to a first structured query language query;
selecting a second structured query language query;
identifying nouns in the second structured query language query;

inferring at least one verbal phrase for the nouns in the second structured query language query;

creating at least one natural language sentence from the at least one verbal phrase for the nouns in the second structured query language query;

creating at least one user sentence pattern from the at least one natural language sentence; and storing the at least one user sentence pattern to the first training data;

wherein the first training data further is configured for use in machine learning to train a SQL-to-text model, the SQL-to-text model comprising a second artificial neural network and configured to convert the first structured query language query to second natural language text.

12. The computer program product of claim 11, wherein the program code is executable by the data processing system to initiate operations further comprising:

identifying compound nouns related to the fields of the table; and identifying logical conjunctions related to the compound nouns;

wherein determining the structured query language pattern further is based on the compound nouns and logical conjunctions related to the compound nouns.

13. The computer program product of claim 11, wherein the program code is executable by the data processing system to initiate operations further comprising:

selecting, from a training corpus, a second database schema that includes a same type of data as a first database schema of the first database;

selecting the second structured query language query from second training data for the second database schema;

replacing, in the second structured query language query, table and field names with table and field names for the first database schema;

replacing, in the second structured query language query, second values with first values selected from the first database; and responsive to the replacing, in the second structured query language query, the table and field names with the table and field names for the first database schema, and responsive to the replacing, in the second structured query language query, the second values with the first values selected from the first database, storing the second structured query language query to the first training data.

14. The computer program product of claim 13, wherein the program code is executable by the data processing system to initiate operations further comprising:

executing the second structured query language query against the first database; and determining whether the executing the second structured query language query against the first database returns an empty result;

wherein the storing the second structured query language query to the first training data further is responsive to the executing the second structured query language query against the first database not returning the empty result.

15. The method of claim 1, further comprising:

including the second natural language text in one or more query results.

16. The computer program product of claim 11, wherein the program code is executable by the data processing system to initiate operations further comprising:

including the second natural language text in one or more query results.

17. The method of claim 1, further comprising:

creating one or more associations between the stored at least one user sentence pattern and at least one structured query language query.

18. The system of claim 9, the executable operations further comprising:

creating one or more associations between the stored at least one user sentence pattern and at least one structured query language query.

19. The computer program product of claim 11, wherein the program code is executable by the data processing system to initiate operations further comprising:

creating one or more associations between the stored at least one user sentence pattern and at least one structured query language query.

20. The system of claim 9, the executable operations further comprising:

including the second natural language text in one or more query results.

* * * * *